July 26, 1949.　　　　J. H. TREVITT　　　2,477,102
MECHANICAL GOVERNOR
Filed Oct. 24, 1945　　　　　　　　　2 Sheets-Sheet 1
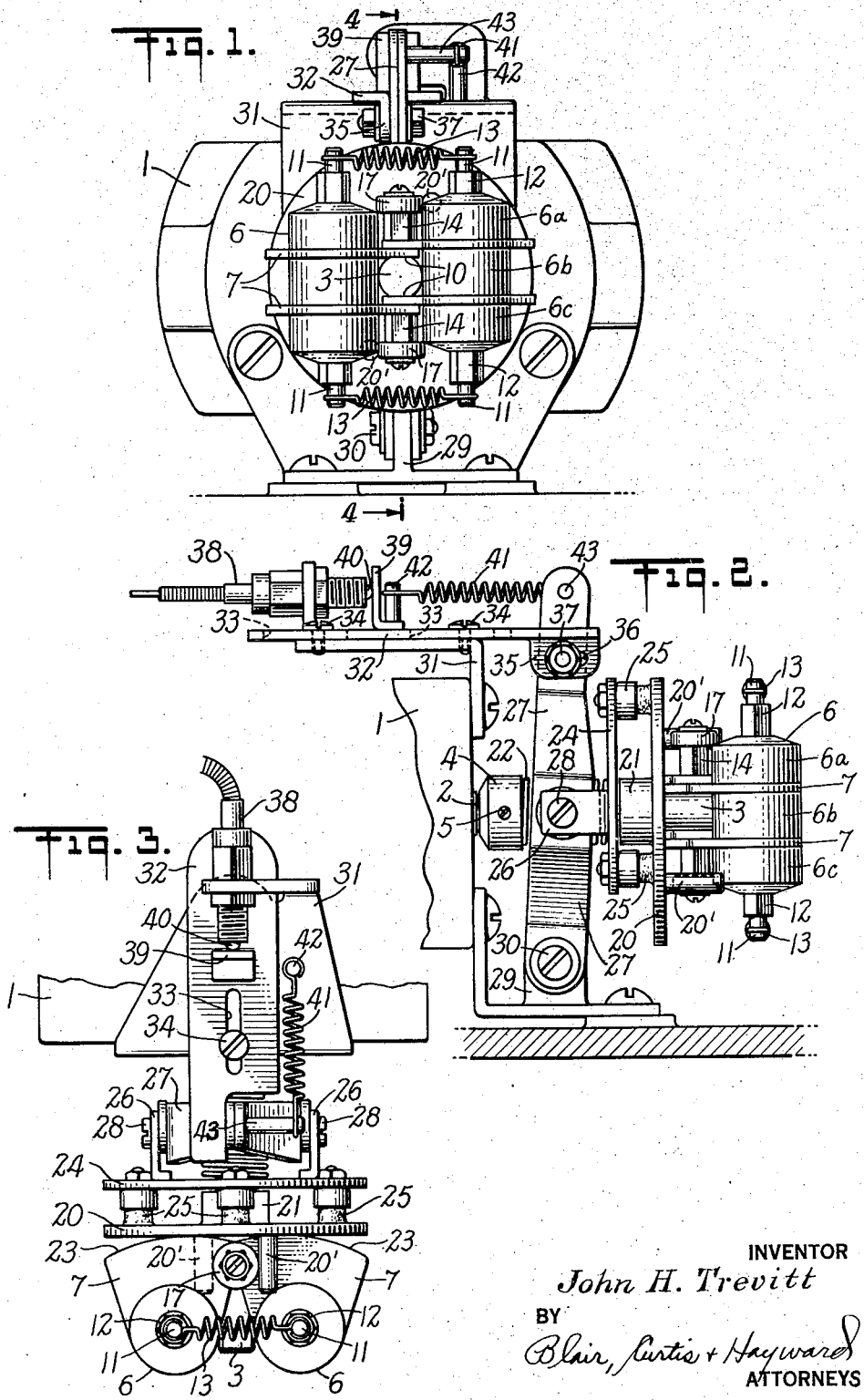
INVENTOR
John H. Trevitt
BY
Blair, Curtis + Hayward
ATTORNEYS July 26, 1949.  J. H. TREVITT  2,477,102
MECHANICAL GOVERNOR
Filed Oct. 24, 1945  2 Sheets-Sheet 2
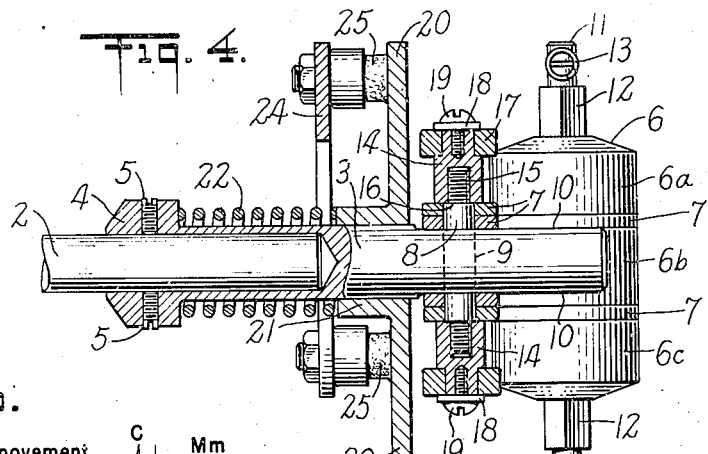
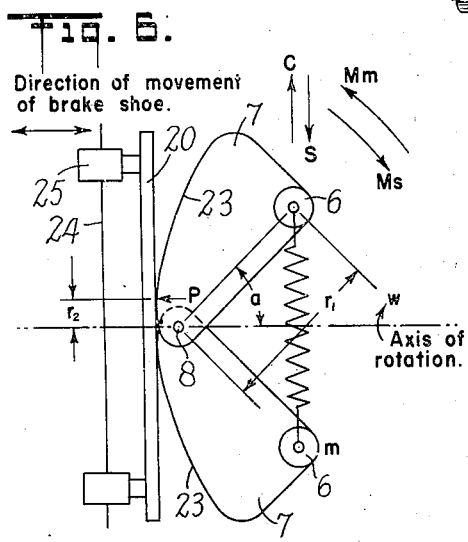
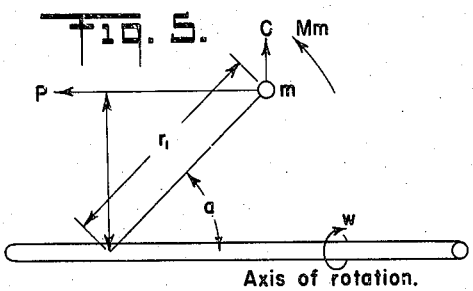
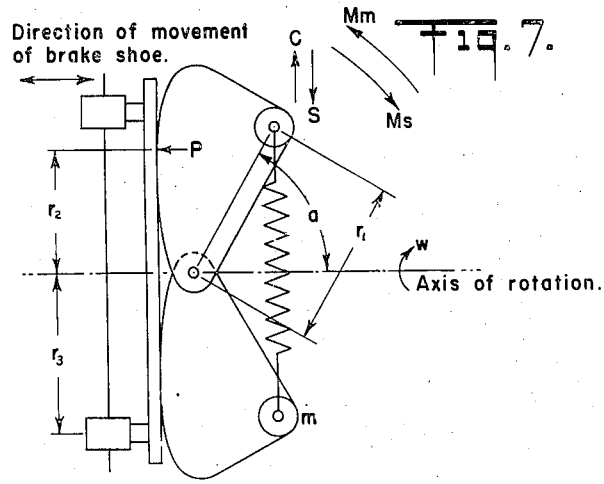
INVENTOR.
John H. Trevitt
BY
Blair, Curtis & Hayward
ATTORNEYS Patented July 26, 1949

2,477,102

UNITED STATES PATENT OFFICE 2,477,102

MECHANICAL GOVERNOR

John H. Trevitt, Bridgeport, Conn., assignor to Dictaphone Corporation, New York, N. Y., a corporation of New York Application October 24, 1945, Serial No. 624,272

4 Claims. (Cl. 188—187)

This invention relates to centrifugal governors and, more particularly, governors suitable for controlling the speed of phonograph motors and the like, wherein a controlled braking action is employed to regulate a wide variation of the speed.

In the case of recording phonographic machines, maintenance of constant speed is necessary to prevent distortion and change of pitch in the recorded sound. These reasons for holding the speed constant are also applicable to reproducing machines; but, in addition, it is necessary to vary the speed over a predetermined range and maintain the selected speed constant.

One object of the present invention is to provide a simple and efficient governor of small size having good regulation and substantially vibrationless operation over the whole controlled speed range of the governor.

Another object is to provide a simple and practical governor of the above type adapted to control a speed variation of very wide range.

Other objects will be in part obvious and in part pointed out hereinafter.

The invention, accordingly, consists in the features of construction, combination of elements, and arrangements of parts which will be exemplified in the structure to be hereinafter described and the scope of the application of which will be indicated in the following claims.

In the accompanying drawings, in which is shown one of the various possible embodiments of the invention, Fig. 1 is an end elevation showing the motor whose speed is to be controlled, with the governor mounted in front thereof upon the motor shaft;

Fig. 2 is a side elevation, partly broken away, as seen from the left in Fig. 1;

Fig. 3 is a top plan view of the apparatus as shown in Fig. 1, with weights shown in closed position near the shaft axis;

Fig. 4 is a vertical cross-section of the governor parts taken on line 4—4 of Fig. 1;

Fig. 5 is a diagram showing the distribution of forces in a governor having swinging weights with the pivot in the axis of the rotating shaft;

Fig. 6 is a similar diagram in a governor of the same type having the weights connected by a tension spring and cams for counteracting the forces which are due simply to action of the weights; and Fig. 7 is a diagram similar to Fig. 6 showing weights and cams in a different operative position.

In a patent application of Charles L. Bossmeyer, filed September 21, 1945, Serial No. 617,787, now Pat. No. 2,433,885, there was shown a governor comprising weights pivotally mounted to swing about axes in and normal to the motor shaft, which were actuated centrifugally to cause axial cooperation of the brake members of the governor, thus effecting frictional control of the speed of the motor. In that disclosure no springs were employed to modify the thrust effect of the weights, but the weights themselves were designed to act as cams to cause limited modification of the effects of changing centrifugal action. This modifying means as embodied in the cams of the general shape shown in the said application, while satisfactory for the purpose where a relatively narrow range of speed variation is wanted, fails in a situation where speeds to be controlled may vary all the way from a low of about 700 R. P. M. to a high of 2800 R. P. M., a four to one speed variation. The difficulty of covering such a wide range is augmented by the requirement of good speed regulation throughout the range. Since, for use in wide range phonograph control, the motor has to be simple in construction and small in size in order to secure controlled wide speed variation with changes of mechanical load caused by the action of a friction governor, it is necessary to use either a series commutator motor or an induction motor having high rotor resistance. Both of these motor types have much higher torque at low than at high speeds.

The governor herein described meets satisfactorily all of the conditions above set forth. It is of the centrifugal weight operated type having springs to counteract the centrifugal action. Weight operated governors exert a force which increases with the square of the motor speed, while the speed-torque characteristic of the motor requires a small force at high speed and a large braking force at low. Herein this reversal of the force-speed gradient of the weights is obtained principally by the use of counteracting springs, but also, to some degree, as in the said Bossmeyer application, by a change of direction of the acting forces by means of cams which shift the point of attack of the transmitted braking force from a point of largest mechanical amplification at lowest speed to a point of greatest mechanical reduction at highest speed.

Referring to the drawings, the motor indicated at 1 is of the capacitor run inductive type with two poles and with high resistance squirrel cage rotor. The controlled speed is between 700 and 2800 R. P. M. The motor shaft 2 carries a coaxial shaft extension 3 having a sleeve portion 4 fixedly mounted upon the end of shaft 2 by means of set screws 5 (see Fig. 4).

Each of two governor weights 6, see Figs. 1 and 3, is mounted by cam plates 7, loosely supported upon a cross-shaft or pivot 8 extending through a bore 9 in the shaft extension 3. The two shafts interfit tightly and their axes intersect at right angles. The pairs of cam members 7 comprising part of and supporting the respective weights are slightly offset upon the cross-shaft 8 relative to the axis of the shaft extension 3, best shown in Fig. 1, so that in operation the inner cam plates, one of each pair, are pressed by a small component of centrifugal force against opposing flattened sides 10 of the shaft extension 3. This prevents binding between the adjacent members of the two sets of cam plates. Each weight proper 6 is made up of three sections 6a, 6b and 6c mounted upon a stud 11, and the cam plates are mounted upon the stud 11 between the central weight section 6b and the outer sections 6a and 6c. The studs are threaded to receive nuts 12 for holding the parts together. Extensions of the studs 11 are grooved to receive the looped ends of a pair of tension springs 13 which tend to hold the weights inwardly against the motor shaft extension 3.

By reference to Fig. 4, it will be seen that the contiguous cam plates on either side of the shaft extension are held more or less loosely against the said flattened portions 10 by means of nut studs 14 which engage threaded portions 15 of the cross-shaft 8 and are drawn tightly against shoulders 16 formed upon the cross-shaft, the cam plates being held rotatably upon the cross-shaft between the opposing surfaces of the stud nuts and extension shaft. Thus the cams are held in position upon the cross-shaft with sufficient operational tolerance by the nut studs. The outwardly extendings ends of the nut studs serve as bearings for small rollers 17 which are held thereon by washers 18 and screws 19 which take into threaded holes in the ends of the nut studs.

A brake disc 20 having a hub portion 21 is rotatably and slidably mounted upon the shaft extension 3 between the cross-shaft 8 and the sleeve 4. A compression spring 22 interposed between sleeve 4 and hub 21, serves at all times to press the brake disc resiliently against the functional faces 23 of the cam plates. Rotation of the cams with the shaft extension 3 is transmitted to the brake disc 20 by means of pins 20', carried by the brake disc in the path of rotation of the rollers 17 about the shaft 3.

The control mechanism for the governor comprises a control disc 24 carrying three equally spaced brake shoes 25 adapted to cooperate with the brake disc 20 to control the speed of rotation of the motor shaft and to vary at will the speed at which the governor is to control.

Referring to Figs. 1, 2 and 3, the control disc 24 is supported by a pair of bracket members 26 whose rearward extensions are pivotally mounted upon a bifurcated lever 27 by means of pivot screws 28. The lower ends of said lever are pivotally mounted upon a motor frame bracket 29 as by pivot bolt 30, so as to enable a rocking movement of the lever and control disc toward and away from the governor brake disc 20. An upper motor frame bracket 31 supports a slide plate 32 which is provided with elongated slots 33 through which extend shoulder screws 34 which are threaded into the bracket 31. The right-hand end of plate 32 carries a downwardly extending flange 35 which is also slotted, as at 36. A bolt 37 passing mutually through slot 36 to a point near the upper end of lever 27, secures said lever adjustably to said slide plate. Bracket 31 also supports in well known manner, as at 38, the outer elements of a Bowden wire control member. An upstanding contact member 39 carried by the plate 32 is held resiliently against the end of the inner element of the Bowden wire (as at 40) by means of a tension spring 41, stretched between a pin 42, upstanding from the bracket 31, and a pin 43 extending laterally from the side of the lever 37, at its upper end.

From the foregoing description of the governor control mechanism it will be obvious that any desired position may be given to the control disc 24 with respect to the brake disc 20 so as to determine the controlled speed of the motor shaft by simple manipulation of the Bowden wire from any suitable remote point. Thus the axial operative position of brake disc 20 is determined by the setting of the governor control mechanism.

Normally when the motor is not in operation the weights 6 are held against the shaft extension 3 by the pressure of spring 22 upon the brake disc, in which position little or no pressure exists between the brake disc and the brake shoes 25. When the motor starts to rotate, the weights move outwards pressing disc 20 against the brake shoes. The braking torque is determined by the angle of the weights and the contact or operating point of the cam surfaces, which is itself determined by the setting of the governor control.

The force equations in the new governor may best be understood by reference to the diagrammatic figures of the drawing, 5, 6 and 7.

Fig. 5 shows the principle involved in the suspension of the governor weight.

The weight with mass $m$ is forced to rotate with the angular velocity $w$ of the motor shaft and is pivoted for swinging in a radial plane with a radius $r_1$, the distance between pivot center and center of gravity of weight. The angle between the motor shaft and the common center line of the weight and pivot is $a$.

The centrifugal force $C$ acting on the weight $m$ is then:

$$C = mw^2 r_1 \sin a \tag{1}$$

The torque $Mm$ around the pivot exerted by $C$ is:

$$Mm = Cr_1 \cos a = \frac{m}{2} w^2 r_1^2 \sin 2a \tag{2}$$

The axial braking force $P$ exerted on the brake disc for any angle $a$ and speed $w$ is:

$$P = \frac{Mm}{r_2} = \frac{m}{2} w^2 \frac{r_1^2}{r_2} \sin 2a \tag{3}$$

where $r_2$ is the radial distance from the pivot to the point of attack of the force $P$. This force $P$ is largest for $\sin 2a = 1$ or $a = 45°$ and it is zero for $a = 90°$. The variation of the braking force $dP$ for any change $dw$ is:

$$dP = 2a = dP = m \cdot w dw \frac{r_1^2}{r_2} \sin 2a \tag{4}$$

$dP$ will be called the regulating force because it determines the speed regulation while $P$ determines the average speed setting.

The regulating force will be very small for a large angle $a$. The regulation at high speed will, therefore, be poor.

This condition is improved in a governor designed as indicated in Figs. 6 and 7 which show respectively the point of attack of the force $P$ when the weights occupy positions respectively close to and more remote from the shaft axis. These figures show modification of braking force application both by spring and cam action.

The force equations will be understood by reference to Fig. 6. In this figure the basic design of the swinging weight is retained, but a counteracting spring force S and a variation of $r_2$ by cam action has been added to reduce the travel of the weights, which is necessary for wide speed variation and for improving the regulation at the higher speeds.

The counteracting force of the spring S is $$S = Kr_1 (\sin a - \sin A_0) \qquad (5)$$

where K is the spring constant and $A_0$ is the angle corresponding to no tension on the spring.

The torque Ms around a pivot exerted by the spring force S is:

$$Ms = Sr_1 \cos a \qquad (6)$$

Combining 2 and 6 gives the torque M for one weight with counteracting spring force S as:

$$M = Mm - Ms = \frac{m}{2} w^2 r_1^2 \sin 2a - Sr_1 \cos a \qquad (7)$$

The brake force P for one weight is now:

$$P = \frac{M}{r_2} = \frac{r_1}{r_2}\left(\frac{m}{2} w^2 r_1 \sin 2a - S \cos a\right) \qquad (8)$$

where $r_2$ now varies according to the cam shape. The regulating force is, as before:

$$dP = m \, w \, dw \frac{r_1^2}{r_2} \sin 2a \qquad (4)$$

as the spring force does not change with a mere change of speed in a rigid system. But sin 2a will be now much larger than before as the travel of the weights has been reduced.

The brake torque T exerted on the motor depends on the coefficient of friction $f$ between brake shoe and brake disc, on the radius $r_3$ of the brake shoes and on the number of weights N and the brake force P $$T = fPNr_3 = f\frac{r_1 r_3}{r_2}(mw^2 r_1 \sin 2a - 2s \cos a) \qquad (9)$$

for two weights.

The gain in regulating force dP by introduction of the springs as in the present embodiment can be shown as follows:

A certain brake force $$P = \frac{m}{2} w^2 \frac{r_1^2}{r_2} \sin 2a$$

is required to hold the motor speed down to a desired amount for the system shown in Fig. 5. This brake force is not changed by the changes indicated in Fig. 6 as the motor and brake disc were not changed. The brake force for system 2 can be expressed as $$P = (n+1)P - nP \qquad (10)$$

where $(n+1)$ P stands for $$\frac{m}{2} w^2 \frac{r_1^2}{r_2} \sin 2a'$$

and $n$P stands for the spring force $$S\frac{r_1}{r_2} \cos a'$$

The angle $a'$ for the same P as in system 1 is, of course, different from the angle $a$ in system 1. $dP_2$ for system 2 is then, by comparing 4 and 10, $$dP_2 = (n+1) dP_1$$

From the above it will be easily understood that in system 2 the regulation will be better the larger the spring force as $$n = \frac{S}{P}\frac{r_1}{r_2} \cos a'$$

When the spring force is, for instance, ten times the brake force P, then the regulating force will be eleven times the regulating force without springs.

It will be seen from the above that there is provided by this invention a construction of an essentially practical nature in which the several objects of the invention are attained.

As many possible embodiments may be made of the invention without departing from the scope thereof, it is to be understood that all matter herein set forth or shown in the accompanying drawing is to be interpreted as illustrative and not in a limiting sense.

I claim:

1. In a governor mechanism of the character described having a stationary brake member mounted adjustably in cooperative relation to a rotatable shaft and an axially and rotatably movable brake member on said shaft cooperative with said stationary member, brake operating means comprising a pair of weights mounted in balanced relation upon opposite sides of said shaft and pivoted to be swung by centrifugal force about a pivot mounted in and extending transversely through said shaft in axially normal relation therewith, resilient means operatively connecting said weights and adapted partially to counteract centrifugal force and limit the swing of said weights, and positive cooperative means associated with said weight pivot and said movable brake member for imparting rotation to said movable member.

2. In a centrifugal governor of the character described comprising a rotatable shaft, a brake member rotatably and slidably mounted on said shaft, and a pair of centrifugally actuated weights carried respectively upon opposite sides of said shaft for imparting rotation and axial movement to said brake member, a pivot carried by said shaft in intersecting normal relation to the axis of said shaft, a pair of supporting arms for each of said pair of weights movably mounted upon said pivot astride said shaft, one member of each pair of arms lying in contact with said shaft upon opposite sides thereof and the other member of each pair lying in contact with the said one member of the other pair, means for holding the pivot and weight arms in operative relation to said shaft, spring means connecting said weights and normally holding them in closed-in position relatively to said shaft, and resilient means tending at all times to hold said brake member in operative contact with said weight arms.

3. In a centrifugal governor of the character described comprising a rotatable shaft, a brake member rotatably and slidably mounted on said shaft, and a pair of centrifugally actuated weights carried respectively upon opposite sides of said shaft for imparting rotation and axial movement to said brake member, a pivot carried by said shaft in intersecting normal relation to the axis of said shaft, a pair of cam-faced supporting arms for each of said weights movably mounted upon said pivot astride said shaft, the respective pairs being in oppositely offset relation to the center of said shaft, means for holding said weight arms upon said pivot in operative relation to said shaft, and resilient means tending to move said brake member into contact with said cam-faced arms and, thereby, said weights into closed-in position relatively to said shaft.

4. In a centrifugal governor of the character described comprising a rotatable shaft, a brake member rotatably and slidably mounted on said shaft, and a pair of centrifugally actuated weights carried respectively upon opposite sides of said shaft for imparting rotation and axial movement to said brake member, a pivot carried by said shaft in intersecting normal relation to the axis of said shaft, cam-faced arms movably supporting said weights upon said pivots in balanced relation to said shaft, spring means connecting said weights and tending to draw them into closed-in position adjacent the sides of said shaft, and resilient means tending to hold said brake member in contact with said cam-faced weight arms.

JOHN H. TREVITT.

REFERENCES CITED

The following references are of record in the file of this patent:

UNITED STATES PATENTS

| Number | Name | Date |
|---|---|---|
| 675,608 | Nelson | June 4, 1901 |
| 859,780 | Rodesch | July 9, 1907 |
| 962,819 | Cowley | June 28, 1910 |
| 2,433,885 | Bossmeyer | Jan. 6, 1948 |